S. A. Moody,

Bandage.

No. 2,165. Reissued Jan. 30, 1866.

Attest:

Jas. R. Hall

M. M. Livingston

Inventor:

S. A. Moody

AM. PHOTO-LITHO. CO. N.Y. (OSBORNE'S PROCESS.)

UNITED STATES PATENT OFFICE.

SARAH A. MOODY, OF NEW YORK, N. Y.

IMPROVEMENT IN ABDOMINAL SUPPORTERS.

Specification forming part of Letters Patent No. 42,591, dated May 3, 1864; Reissue No. 2,165, dated January 30, 1866.

*To all whom it may concern:*

Be it known that I, SARAH A. MOODY, of the city, county, and State of New York, have invented certain new and useful Improvements in Corsets and other Abdominal Supporters; and I do hereby describe and ascertain my said invention as follows, referring to the accompanying drawings, in which—

Figure 1:
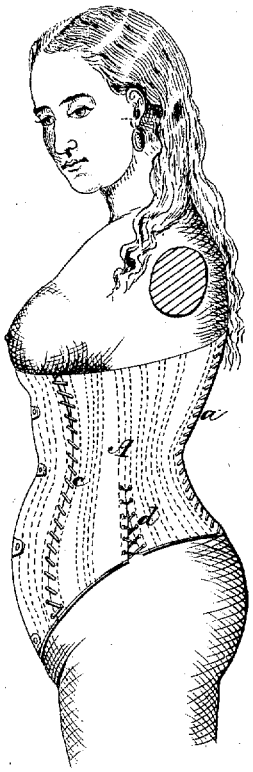
Figure 2:
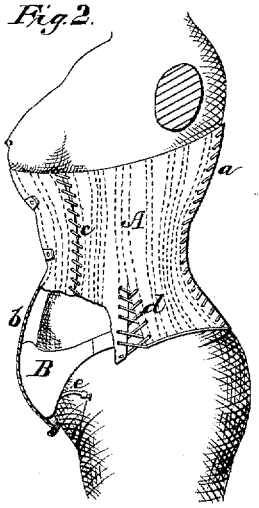

Figure 1 is a side view of my invention; Fig. 2, the same with a portion of the corset removed.

My improvements consist in so constructing corsets, stays, or other abdominal supporters as to perform the functions of supporting the abdomen in all cases where such support is required, adding thereto, when necessary, certain air sacks or bags for local pressure in the various cases where trusses or other apparatus have been heretofore used—as in cases of hernia, prolapsus uteri, and pregnancy or enlarged abdomen, &c.—the supporter and its appendages being capable of such application and adjustment as to produce the requisite pressure and support in any required direction to suit the specific case of the patient to whom they are fitted, the devices being applicable to males as well as females, adults, and children.

The construction of my apparatus is as follows: Referring to the drawings, A represents a pair of corsets open at the front and back and united at the back by lacings *a*. In front there are two flat elastic plates, *b b*, of metal, whalebone, wood, or other suitable material, one on each side of the opening, which opening is closed and held together by hooks and eyes, perforated plates and knobs, or other proper fastening which can be readily fastened and unfastened. The front of the corset or supporter extends down lower than the ordinary corset, the lower edge conforming to the form of the pelvis, so as to inclose and support the entire abdomen. On the sides of the corset or supporter are other openings, that are connected with lacings *c* and on the hips at *d* are also laced openings. These several openings are to aid in fitting the parts properly to the person, and the side openings are specially important in cases of pregnancy, where the form is constantly changing.

In order to provide for all cases that may occur in practice, I employ an air sack or sacks, B, of india-rubber or other suitable material, which may be appended in any suitable way to the inner surface of the corset or supporter at any point or points where I desire to produce local pressure, the form and size of these sacks being adapted to the specific cases for which they are intended, and they can be inflated with air more or less to suit the circumstances of the case.

*e* is a flexible tube, with a faucet, for the purpose of inflation.

In cases where the abdomen of the patient has very little prominence or is hollow the use of a sack of the above description becomes important, in order to bring the necessary pressure upon the abdomen.

This corset or abdominal supporter has been practically tested with and without the inflated sacks for local pressure, and can be adjusted perfectly to any case, so as to be worn with great ease and comfort. There are no parts that chafe the wearer, and a general elasticity and adaptability pervade the whole structure, rendering it efficient in cases of pregnancy, hernia, prolapsus uteri, and other abdominal difficulties.

Having thus fully described my new and useful improvements in abdominal supporters for surgical and other purposes, what I claim therein as new, and for which I desire to secure Letters Patent, is—

1. The corsets or abdominal supporters herein specified, having the front extended down to the line of the pelvis, so as to cover the abdomen with elastic plates *b b*, as described, and side lacings, as above specified, constructed, arranged, and combined as and for the purposes herein set forth.

2. In combination with an abdominal supporter, substantially as above specified, the air-sacks B, as and for the purposes herein set forth.

S. A. MOODY.

Witnesses:

STEPHEN G. CLARKE,

J. J. GREENOUGH.